United States Patent [19]
Leicht

[11] Patent Number: 5,836,421
[45] Date of Patent: Nov. 17, 1998

[54] LUBRICATING SYSTEM FOR INTERNAL COMBUSTION ENGINES

[75] Inventor: Werner Leicht, Stetten, Germany

[73] Assignee: MTU Motoren- und Turbinen Union Friedrichshafen GmbH, Friedrichshafen, Germany

[21] Appl. No.: 693,751

[22] Filed: Aug. 7, 1996

[30]     Foreign Application Priority Data

Aug. 12, 1995 [DE] Germany .................. 195 29 733.4

[51] Int. Cl.⁶ .............................. F01M 1/20; F01M 11/06
[52] U.S. Cl. ............................ 184/6.2; 184/6.4; 184/6.5; 184/6.6; 184/31; 184/45.1; 123/196 R; 123/196 S
[58] Field of Search ................ 184/6.2, 6.3, 6.4, 184/6.5, 6.6, 6.8, 7.4, 26, 27.2, 31, 45.1, 45.2, 105.1, 108; 123/196 R, 196 S; 92/153; 215/312; 220/203.21, 203.2, 203.19, 374

[56]             References Cited

U.S. PATENT DOCUMENTS

| | | | |
|---|---|---|---|
| 2,273,737 | 2/1942 | Snyder | 220/203.21 |
| 2,326,167 | 8/1943 | Piaverez | 184/6.3 |
| 4,417,561 | 11/1983 | Yasuhara | 123/196 R |
| 5,197,424 | 3/1993 | Blum | 123/196 S |

FOREIGN PATENT DOCUMENTS

| | | |
|---|---|---|
| 0538660 | 4/1993 | European Pat. Off. . |
| 0859126 | 12/1940 | France . |
| 2026868 | 12/1971 | Germany . |
| 4134568 | 6/1993 | Germany . |
| 1822479 | 6/1993 | U.S.S.R. .................. 184/6.4 |

*Primary Examiner*—Christopher Verdier
*Attorney, Agent, or Firm*—W. G. Fasse; W. F. Fasse

[57]             ABSTRACT

A lubricating system for an internal combustion engine maintains lubrication even in extreme emergency positions of the engine such as slants within the range of about 90° to about 270°, relative to the horizontal and even for upside down engine positions. For this purpose, a hydraulic accumulator (16) is connected to the lubricant circulating circuit through a parallel connection of a non-return valve (17) and a controllable valve. Under normal operating conditions, the hydraulic accumulator is charged with lubricant under the pressure prevailing in the lubricant circulating system. Under emergency conditions, the normal lubrication is stopped and emergency lubrication continues through the controllable valve that is opened in response to a pressure drop in the normal lubricant circulating system.

6 Claims, 2 Drawing Sheets

LUBRICATING SYSTEM FOR INTERNAL COMBUSTION ENGINES

FIELD OF THE INVENTION

The invention relates to a lubricating system for internal combustion engines. Such a system shall assure a continued, adequate lubrication even under unusual operating conditions such as a slanted or even an upside down position under which the engine must operate.

BACKGROUND INFORMATION

Internal combustion engines for motor vehicles or engines for special applications may be exposed to an insufficient lubrication or even an interruption of the lubricant supply under extreme operating conditions such as a severe slanting or when an upside down condition occurs even for short time durations. The difficulties that the lubricant supply must overcome are due to the fact that gravitational forces and/or centrifugal forces are effective on the lubricant which prevent the lubricant from being available for its intended purpose of lubricating.

German patent publication DT-OS 2,026,868 (Limbach) published on Dec. 16, 1971 discloses a lubricating system for propulsion plants in which the oil or lubricant supply is independent of the engine position. An oil suction intake that is connected to a suction pump through a channel system is constructed as a pendulum which orients itself and thus the oil intake in response to any oil level in the oil supply tank. The movement of the pendulum and thus of the oil suction intake depends on gravity and its own relatively large inertia is a disadvantage because slow response motion of the intake may impair the continuity of the oil supply. Besides, the assembly or mounting of a movable pendulum element with an integrated oil suction intake in the oil supply container involves a substantial structural effort and expense.

German patent publication DE 4,134,568 C1 (Lange) published on Jun. 3, 1993 discloses another lubricating system for internal combustion engines, particularly for motor vehicles. The Lange system includes an oil supply container for holding a replenishing oil supply. The supply container is connected in a bypass of the lubricant circulating circuit of the engine to avoid an erroneous overfilling of the engine with lubricating oil. For this purpose the replenishing container has a variable volume. More specifically, the volume of the replenishing container is reduced in response to a diminishing lubricating oil quantity or volume. The volume reduction takes place in such small steps that an overfilling of the engine with lubricating oil is avoided.

European patent publication EP 0,538,660 A1 (Benedetto et al.) published Apr. 28, 1993 discloses an automated refilling oil supply system for an engine. The system includes a sensor cylinder, an actuator cylinder, and programmed operating elements for moving the respective systems in these cylinders. The presence or absence of oil in the chamber of the sensor cylinder is monitored to prevent or enable a sliding of the pistons so that the pistons and the actuator cylinder supply a controlled quantity of oil to a container, whereby this quantity is correlated to the level of the liquid in the container such as the sump or oil pan of the engine.

The known systems still leave room for improvement, especially with regard to assuring an uninterrupted oil supply under difficult operating conditions.

OBJECTS OF THE INVENTION

In view of the above it is the aim of the invention to achieve the following objects singly or in combination:

to provide a structurally simple lubricant supply system for internal combustion engines that remains operational under difficult requirements, for example when the engine assumes a slanted position larger than 90° up to 270° relative to the horizontal or even an upside down position, to make sure that a sufficient oil supply is available at all times under all operating conditions;

to avoid the gravitational movement of a movable mass such as a pendulum oil intake on the flow of lubricant;

to feed under normal operating conditions oil under pressure into an accumulator which then releases pressurized oil under abnormal operating conditions into the lubricant circulating system; and to release the flow of oil under unusual operating conditions in response to the presence of such conditions.

SUMMARY OF THE INVENTION

The lubricating system according to the invention for internal combustion engines combines a lubricant circulating circuit including a lubricant supply tank and at least one circulating pump, with an auxiliary lubricant supply including a hydraulic accumulator connected to the circulating system through a parallel connection of a non-return valve with a controllable valve. The accumulator is charged with lubricant under pressure during normal operation of the engine through the non-return valve. Lubricant under pressure is charged into the circulating circuit from the accumulator through the controllable valve under abnormal operating conditions that reduce the lubricant pressure in the circulating circuit, thereby opening the controllable valve connecting the accumulator to the lubricating circulating circuit.

Preferably the pressure controllable valve that connects the accumulator to the circulating circuit is connected to a lubricant inlet port of the engine to which the circulating circuit is also connected, preferably through a T-junction.

The present system assures the continuity of the lubricant supply without recourse to inherent dynamic features of freely movable masses such as a lubricant intake port formed as a pendulum and its mounting. According to the invention lubricant under pressure is stored in the accumulator under normal operating conditions and a pressure change in the lubricating circuit under abnormal conditions is used to provide a control signal for charging the pressurized lubricant from the accumulator into the lubricant circulating circuit under abnormal operating conditions. The system according to the invention is simple in its structure since standard hydraulic elements are used such as a simple pump for the lubricant circulation and a constant pressure biased accumulator. The accumulator may be a bubble accumulator pressurized by a gas such as nitrogen behind the bubble or a piston accumulator pressurized by hydraulic or pneumatic constant pressure. The volume of the lubricant container in the present system is enlarged by the oil containing volume portion of the accumulator which is an advantage because an extra lubricant volume becomes available for use under abnormal operating conditions.

During normal operating conditions when the lubricant supply container is not inclined or only inclined at an angle of less than 90° relative to the horizontal, the lubricant circulating pump charges the hydrostatic accumulator immediately when the engine is started while simultaneously circulating lubricant in the circulating circuit. When the engine is slanted at an angular range of about 90° to about 270° it becomes possible for the lubricant pump to suck in air from the lubricant supply tank, whereby the oil supply pressure drops. This pressure drop is used to open the controllable valve connecting the accumulator to the circulating circuit, thereby assuring the continued supply of lubricant to the engine during a time duration that depends on the volume of the hydro-accumulator when the engine is slanted by more than 90° to the horizontal or when it is in an upside down position.

In the preferred embodiment the controllable valve connecting the accumulator to the circulating circuit is a 2/2 valve that is opened and closed in response to a signal from a pressure sensor that senses the pressure in the lubricant circulating circuit. The sensor in turn is part of a CDS system (Control and Diagnostic System) which as such is conventional.

According to a further embodiment of the invention gravity controlled valves are provided in respective venting and airing ducts connected to the lubricant supply container. These gravity controlled valves close the lubricant supply container automatically in response to an extreme slanted position of the engine, thereby preventing an escape of lubricant from the lubricant supply container during such extreme engine positions.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
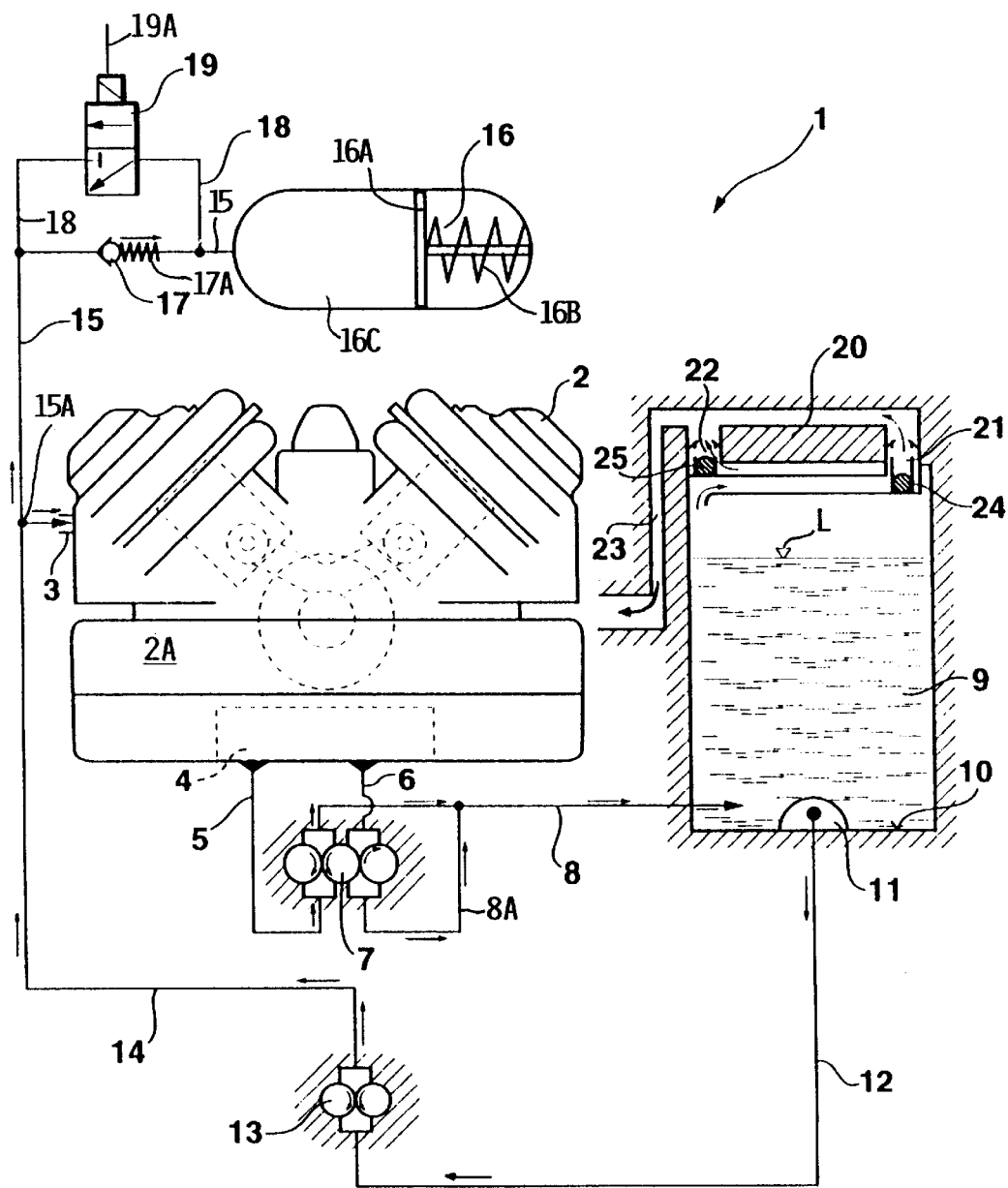
FIG. 1 is a circuit diagram of a lubricating system according to the invention with certain parts shown in section and with the engine shown in its normal operating position.

FIG. 1 shows a lubricating system 1 for an internal combustion engine 2 having a lubricant inlet port 3 for feeding lubricant to the engine through a lubricating circulating circuit connected to the inlet port 3 and to an oil pan 4 in a crankcase 2A of the engine 2. The engine 2 is shown in its normal engine upright position The lubricant circulating circuit will now be described. A suction pump 7, preferably constructed as a double pump, is connected with its suction ports through pipes or hoses 5 and 6 to the oil pan 4. The outlet ports of the pump 7 are connected through pipes or hoses 8 and 8A to an oil supply container or reservoir 9.

The reservoir 9 has a bottom 10 equipped with a suction port 11 connected through a pipe or hose 12 to a circulating pump 13 for the lubricant. The outlet port of the pump 13 is connected through a pipe or hose 14 to the lubricant inlet port 3 of the engine 2, whereby the circulating lubricating circuit is closed. The suction port 11 is preferably positioned in the center of the container bottom 10. The engine position is considered normal as long as the suction port 11 in the container 9 is covered by lubricant.

According to the invention the lubricating circuit is also connected through a further pipe or hose 15 to an auxiliary lubricating device including a hydraulic accumulator 16 having for example a piston 16A under a constant biasing force such as a pneumatic or hydraulic pressure symbolized by a biasing spring 16B. Instead, a pressurized bubble could perform the required biasing function. A volume 16C of the accumulator 16 is filled with lubricant. A non-return valve 15 is connected in series between the accumulator 16 and the line 15. Preferably a T-junction 15A is provided for the connection of the pipe or hose 15 to the lubricant inlet 3 of the engine 2. However, the auxiliary lubricating device according to the invention could be connected instead to the port 3, through an auxiliary port into the engine. The auxiliary lubricating device further includes a controllable valve 19, preferably a 2/2 valve, connected through a pipe or hose 18 in parallel to the non-return valve 17 which is preferably spring biased by a spring 17A. Under normal operating conditions shown in FIG. 1, the non-return valve 17 prevents a return flow of lubricant out of the accumulator 16 into the engine. The valve 19 is controlled through a signal conductor 19A from a control and diagnostic system (CDS) including a pressure sensor S shown in FIG. 2.

The lubricant supply container 9 comprises a cover 20 provided with bores or ports 21 and 22 leading to a venting and airing duct 23 connected to the atmosphere. At least one venting port and at least one air admission port are provided. Gravity operated valves 24 and 25 are positioned in the bores 21 and 22 respectively for closing these bores when the engine should assume abnormal positions, such as even an upside down position, to prevent the escape of lubricant from the container 9. Assuming that the container 9 is filled with lubricant to a sufficient level L, starting the engine 2 will cause the pump 13 to transport lubricant from the container 9 through the pipes or hoses 12 and 14 into the engine 2. Simultaneously lubricant will be charged into the volume 16C of the hydraulic accumulator 16 as long as the engine 2 assumes a normal position. A normal position in this context includes slanting angles up to about 90 ° or about 270° to 360° . The accumulator 16 may be charged to a pressure of for example five bar by the lubricant pump 13, whereby the non-return valve 17 prevents a return flow of lubricant out of the accumulator 16 into the pipe or hose 15. Under these normal operating conditions, the valve 19 is closed. The gravity operated valves 24, 25 keep the bores 21 and 22 open so that the container 9 is vented through the duct 23.

Referring further to FIG. 1, the lubricant suction port 11 is preferably arranged approximately in the center of the bottom 10 of the container 9. Provided the container 9 is filled more than half with lubricant, the suction port 11 will be covered with lubricant in all engine positions within the range of 0 ° up to about 90° or 270° to 360° . Under these operation conditions, the engine will be continuously supplied with lubricant through the above described circuit including the pumps 7 and 13 circulating the lubricant through the engine and through the container 9.

Figure 2:
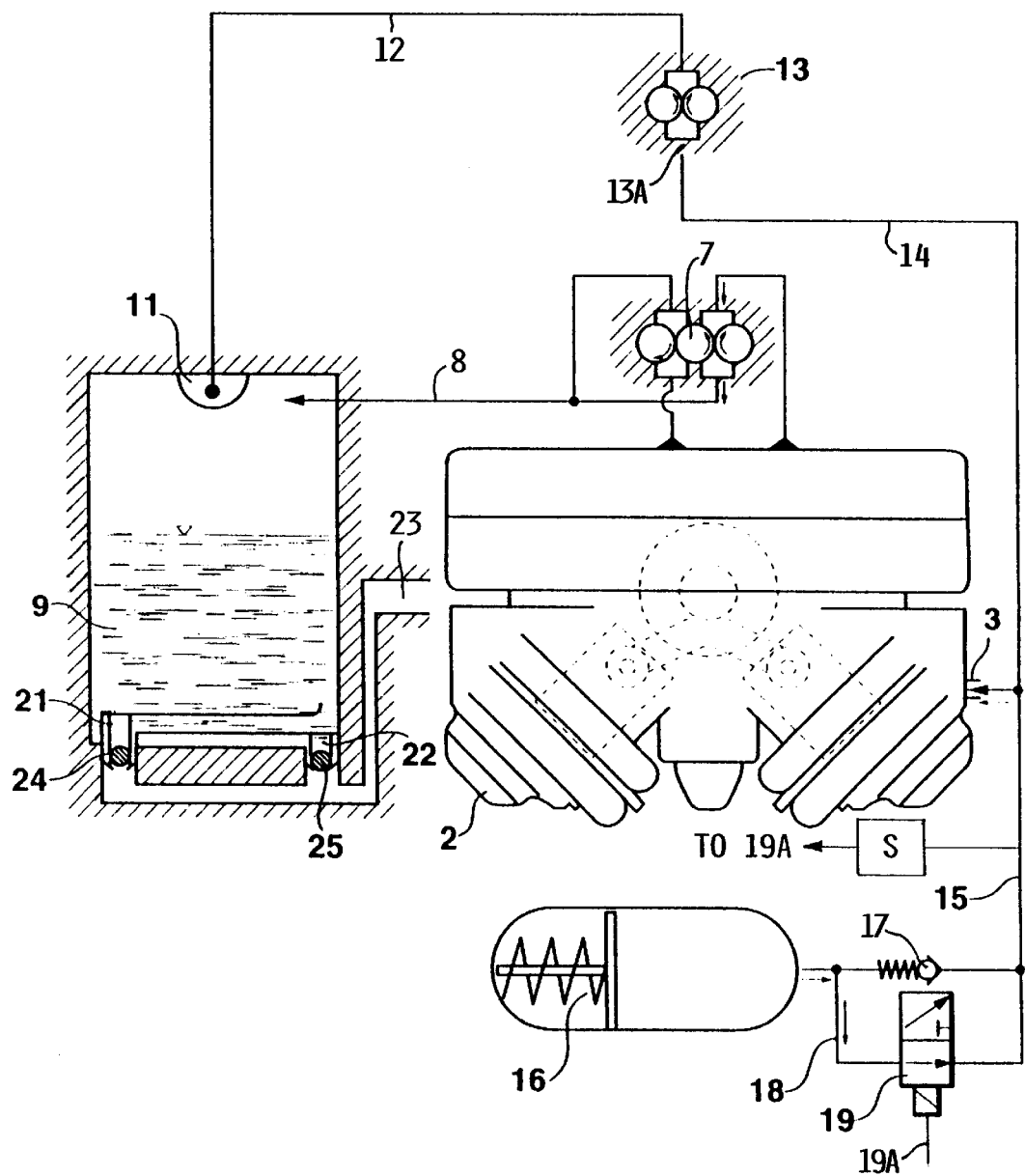
FIG. 2 is a repetition of FIG. 1, however, illustrating the system with the engine in an upside down 180 degree rotated position and showing certain parts in section.

FIG. 2 illustrates the engine 2 in an upside down 180° rotated position, whereby the lubricant in the container 9 no longer covers the suction port 11 and the flow of lubricant through the circulating circuit is interrupted as symbolically shown at 13A where the pipe or hose 14 is disconnected from the circulating pump 13. Operating conditions other than normal occur, when the suction port 11 of the container 9 is no longer covered by lubricant. In these not normal conditions the valves 24 and 25 have closed the bores 21 and 22 respectively to prevent escape of lubricant. This not normal situation occurs also when the slant is within the range of 90° up to 270° . In this condition, the pump 13 runs empty, so to speak, and the pressure in the pipe or hose 15 drops. The sensor S monitors this pressure drop and provides a control signal to the signal conductor 19A of the valve 19, thereby opening the valve 19 so that lubricant under pressure in the accumulator 16 is now flowing into the hose or pipe 15 to continue the lubrication of the engine 2 substantially without any interruption. The opening of the valve 19 may for example occur when the pressure in the pipe or hose 15 drops below one bar. As a result, the system according to the invention continues the lubrication with the lubricant from the volume 16C of the accumulator 16 for engine positions within the range of about 90° to 270° and even for upside down engine positions in an emergency substantially without interruption.

Although the invention has been described with reference to specific example embodiments, it will be appreciated that it is intended to cover all modifications and equivalents within the scope of the appended claims.

What is claimed is:

1. A lubricating system for an internal combustion engine (2), comprising a lubricant supply container (9) having an inlet port (8) and a suction port (11), a return line (5, 6) connecting said engine (2) to said inlet port (8) of said supply container (9), a first pump (7) in said return line for transporting lubricant from said engine (2) to said supply container (9), a supply line (12, 14) connecting said suction port (11) to said engine (2), a second pump (13) in said supply line (12, 14) for transporting lubricant from said suction port (11) to said engine (2), an accumulator (16), an accumulator line (15) connecting said accumulator (16) to said engine (2) and to said supply line (14) so that under normal operating conditions said second pump (13) keeps lubricant circulating and said accumulator (16) pressurized, a parallel connection comprising a non-return valve (17) for charging said accumulator and a controllable first valve (19) connecting said accumulator (16) to said accumulator line (15), a sensor (S) for sensing a pressure drop signifying an inadequate lubricant supply to said engine under operating conditions other than normal for controlling said controllable valve (19) to open for feeding lubricant from said accumulator (16) to said engine (2) under said other than normal operating conditions, said supply container (9) further comprising at least one venting and air admission port and at least one controllable second valve (24 or 25) in said at least one venting and air admission port for keeping said port open under said normal operating conditions and for closing said port under said other than normal operating conditions, whereby said engine is lubricated even in an upside-down position by said accumulator (16).

2. The lubricating system of claim 1, wherein said at least one second controllable valve is gravity controllable.

3. The lubricating system of claim 1, wherein said controllable first valve (19) is a 2/2 valve.

4. The lubricating system of claim 1, further comprising a pressurizer for maintaining a minimal constant pressure in said accumulator.

5. The lubricating system of claim 1, further comprising a lubricant inlet port (3) in said engine (2), and a T-junction (15A) connecting said supply line (14) and said accumulator line (15) to said lubricant inlet port (3) of said engine (2).

6. The lubricating system of claim 1, comprising at least two venting and air admission ports in said supply container and at least one controllable valve in each of said venting and air admission ports.

* * * * *